US008200835B2

(12) United States Patent
Beckmann et al.

(10) Patent No.: US 8,200,835 B2
(45) Date of Patent: Jun. 12, 2012

(54) METHOD FOR TRANSMITTING DATA FROM AN EMITTER TO A PLURALITY OF RECEIVERS

(75) Inventors: Mark Beckmann, Braunschweig (DE);
Michael Eckert, Braunschweig (DE);
Martin Hans, Hildesheim (DE);
Andreas Otte, Celle (DE)

(73) Assignee: Siemens Aktiengesellschaft, Munich (DE)

( * ) Notice: Subject to any disclaimer, the term of this patent is extended or adjusted under 35 U.S.C. 154(b) by 547 days.

(21) Appl. No.: 10/486,466

(22) PCT Filed: Jul. 26, 2002

(86) PCT No.: PCT/EP02/08351
§ 371 (c)(1),
(2), (4) Date: Nov. 12, 2004

(87) PCT Pub. No.: WO03/015439
PCT Pub. Date: Feb. 20, 2003

(65) Prior Publication Data
US 2005/0066034 A1    Mar. 24, 2005

(30) Foreign Application Priority Data

Aug. 7, 2001  (EP) .................................... 01710038
Oct. 15, 2001 (DE) .................................. 101 50 846

(51) Int. Cl.
*G06F 15/16*    (2006.01)
(52) U.S. Cl. ...................................................... 709/230
(58) Field of Classification Search ................. 455/403, 455/424, 425; 709/217–219, 223–233, 236–237
See application file for complete search history.

(56) References Cited

U.S. PATENT DOCUMENTS

| 5,802,465 | A  | * | 9/1998 | Hamalainen et al. | 455/403 |
| 5,831,975 | A  | * | 11/1998 | Chen et al. | 370/256 |
| 6,032,197 | A  | * | 2/2000 | Birdwell et al. | 709/247 |
| 6,085,101 | A  | * | 7/2000 | Jain et al. | 455/500 |
| 6,247,059 | B1 | * | 6/2001 | Johnson et al. | 709/237 |

(Continued)

FOREIGN PATENT DOCUMENTS

| EP | 0896489 A2 | 2/1999 |
| EP | 928119 A2 * | 7/1999 |
| WO | WO 01/19029 | 3/2001 |

OTHER PUBLICATIONS

XP-002191630—3$^{Rd}$ Generation Partnership Project; Technical Specification Group Radio Access Network; Broadcast/Multicast Control BMC (Release 4).

(Continued)

*Primary Examiner* — Jeffrey Pwu
*Assistant Examiner* — Scott M Sciacca
(74) *Attorney, Agent, or Firm* — King & Spalding L.L.P.

(57) ABSTRACT

A method is provided for transmitting data from a sender to a number of receivers. Also provided are an emitting and/or receiving unit and a communication system. The present invention seeks to provide a method, an emitting and/or receiving unit and a communication system for the efficient, resource saving and energy saving transmission of data to a group of receivers of a point-to-multipoint service. To this end, a point-to-multipoint service is carried out as an extension of a broadcast service CBS in a multi-layer protocol system, providing a multimedia transmission and/or a multicast service, preferably in the form of a multimedia broadcast/multicast service MBMS, during the distribution and/or planning of the use of system resources and the use of a discontinuous reception DRX.

17 Claims, 2 Drawing Sheets

U.S. PATENT DOCUMENTS

| | | | | |
|---|---|---|---|---|
| 6,370,153 B1* | 4/2002 | Eng | ............................. | 370/438 |
| 6,771,660 B1* | 8/2004 | Bourlas et al. | ................ | 370/466 |
| 6,965,579 B1* | 11/2005 | Shin | .............................. | 370/312 |
| 6,990,680 B1* | 1/2006 | Wugofski | ........................ | 725/58 |
| 7,020,102 B2* | 3/2006 | Tuomainen et al. | ........... | 370/311 |
| 7,031,708 B2* | 4/2006 | Sarkkinen et al. | ............. | 455/436 |
| 7,046,992 B2* | 5/2006 | Wallentin et al. | ............. | 455/411 |
| 7,103,185 B1* | 9/2006 | Srivastava et al. | ............ | 380/277 |
| 7,310,678 B2* | 12/2007 | Gunaseelan et al. | ........... | 709/230 |
| 2002/0146074 A1* | 10/2002 | Ariel et al. | ................ | 375/240.27 |
| 2002/0150099 A1* | 10/2002 | Pung et al. | .................... | 370/390 |
| 2004/0177154 A1* | 9/2004 | Sarkkinen et al. | ............. | 709/236 |

OTHER PUBLICATIONS

XP-00219629—3$^{rd}$ Generation Partnership Project; Technical Specification Group Radio Access Network; Radio interface for broadcast/multicast services (Release 1999.

Universal Mobile Telecommunications System (UMTS); Radio Interface for Broadcast/Multicast Services (3GPP TR 25.925 version 3.4.0 Release 1999); ETSI TR 125 Technical Report; 34 pages, Mar. 2, 2001.

* cited by examiner

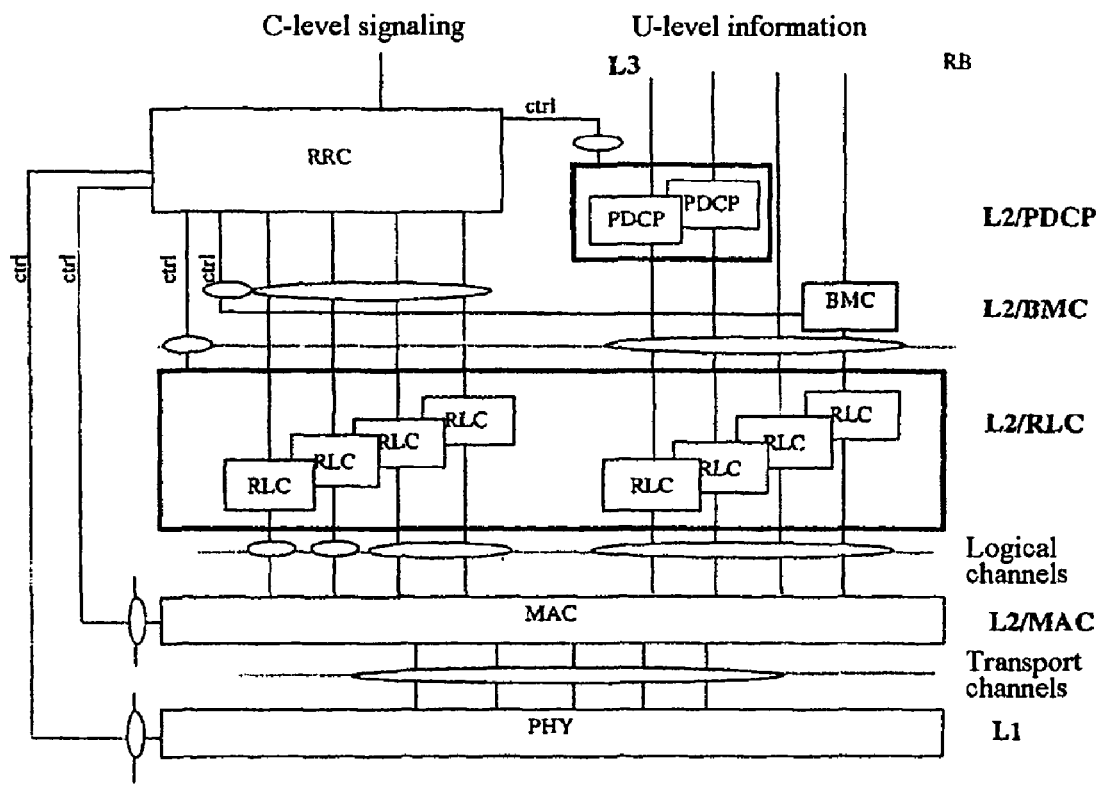
Fig. 1
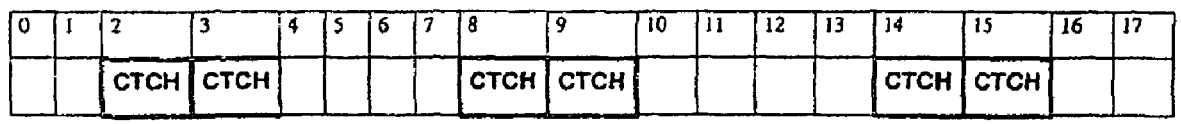
Fig. 2
| Frame numbers | CTCH resource index |
|---|---|
| 2,3 | 1 |
| 8,9 | 2 |
| 14,15 | 3 |
| 20,21 | 4 |
| 26,27 | 5 |
| 32,33 | 6 |
| ... | ... |
Fig. 3

10.3.8.3 CBS DRX level 1 information (TS 25.331)

This information element includes the information about discontinuous CBS reception, which is transmitted to the UE in order to calculate the CBS DRX level 1 information.

| Information element/group name | Require-ment | Multi | Type and Reference | Description of the semantics |
|---|---|---|---|---|
| Period of the CTCH allocation (N) | MP | | Integer (1..256) | $M_{TH} \leq N \leq 4096-K$, N multiple of $M_{TH}$ |
| CBS frame offset (K) | MP | | Integer (0..255) | $0 \leq K \leq N-1$, K multiple of $M_{TH}$ |

New information element or extension for multicast:
- Period of logical channel used for multicast
- MBMS parameter

Fig. 4

10.3 BMC schedule message (TS 25.324)

The BMC schedule message describes, for the subsequent CBS scheduling period, the timing determination for each CBS message and the position determination in the schedule for messages in the subsequent CBS scheduling period.
RLC-SAP: UM.
Logical channel: CTCH.
Direction: UTRAN → UE.

Table 10.3-1: Scheduling message

| Information element | Require-ment | Multi | Type and Reference | Description of the semantics |
|---|---|---|---|---|
| Type of message | MP | | Sec. 11.1 | |
| Offset at the start of the CTCH BS index | MP | | Sec. 11.6 | |
| Length of the CBS scheduling period | MP | | Sec. 11.7 | |
| Bitmap of a new message | MP | | Sec. 11.8 | |
| Description of the message | MP | 1 to <length of the CBS scheduling period> | Sec. 11.9 | Information ele-ment to describe the message is not only in each new message (1 in the new bitmap mes-sage) but also for each old message (0 in the new bit-map message). The i-th information element in the message descrip-tion relates to the i-th bit in the IE of the new bitmap message. |

Fig. 5

METHOD FOR TRANSMITTING DATA FROM AN EMITTER TO A PLURALITY OF RECEIVERS

BACKGROUND OF THE INVENTION

The present invention relates to a method for transmitting of data from a sender to two or more recipients, to a transmitting and/or receiving unit, and to a communications system.

In the case of many services and applications which are offered in modern mobile radio systems, the aim is to transmit messages not just to one mobile radio subscriber but to two or more mobile radio subscribers. Examples of services and applications such as these include news groups, video conferences, video-on-demand, distributing applications, etc.

Where messages are being transmitted to the various subscribers, it is possible to send each recipient a copy of the data separately. Although this technique can be implemented easily, it is not suitable for large groups, however. Since the same message is transmitted to a total of N recipients via individual connections or unicast connections, and is transmitted a number of times in the process over common connecting paths, this method requires a very wide bandwidth.

A better option is offered by multicast transmission. In this case, the various subscribers to which the same message is intended to be transmitted are combined to form a multicast group, which is allocated a multicast address. The data to be transmitted is then sent only once to this multicast address. The MC message is in the ideal case sent only once from the sender to the recipients via common connecting paths. The sender does not need to know where and how many recipients are concealed behind the multicast address.

In the case of broadcast, messages are sent to all the subscribers within a geographical region. A region such as this may, for example, be defined by a part of the overall network. As in the case of multicast, the broadcast message is ideally sent only once via common connecting paths from the sender to the recipients. Each subscriber has to carry out enabling settings on their respective terminal if he/she subsequently wishes to evaluate broadcast packets from a corresponding broadcast group. The subscriber can then determine whether he/she wishes to receive or reject all of the broadcast messages, or to receive only specific messages.

In the course of a known method for data transmission, a specific number of frames are typically always interchanged between a network and a mobile radio within a specific time. A frame is in this case a time structure on which, for example, in the case of UMTS, all of the signal processing and data transmission is based, see also [1].

If all of the frames are transmitted and received by the mobile radio continuously, this is referred to as continuous transmission or continuous reception. However, it is also possible, for transmission, to use interrupted reception or so-called discontinuous reception DRX in order, for example, to reduce the energy requirement of the mobile radios. When using DRX, the frames are not transmitted and received by the mobile radio continuously, but rather specific frames are omitted. In this mode, however, at least one specific subset of all of the frames or a subset of the possible frames must be transmitted in order to maintain the connection.

The present invention is, therefore, directed toward a method, a transmitting and/or receiving unit and a communications system for efficient, resource-saving and energy-saving transmission of data to a group of recipients on a point-to-multipoint service. In particular, is the present invention seeks to allow use for the purposes of a multimedia broadcast/multicast service MBMS.

SUMMARY OF THE INVENTION

Accordingly, a method according to the present invention is distinguished in that a point-to-multipoint service is provided in a system with a multilayer protocol architecture as an extension to a broadcast service CBS by multimedia transmission and/or a multicast service, preferably in the form of a multimedia broadcast/multicast service MBMS, for allocation and/or planning of use of system resources and use of discontinuous reception DRX. Information is thus sent in an efficient form via the point-to-multipoint service, and is transmitted only once in the process. In this case, for the purposes of the present invention, the expression "information" also refers to information which is basically commercial or is sent without being requested; that is to say, in particular, an offer, a commercial or an advertisement for a new product, and consumer information in some other form.

In the case of relatively complex, multilayer protocol architectures, such as the protocol stack in the Universal Mobile Telecommunications System UMTS, no functions have yet been included for group transmission or point-to-multipoint transmissions which either are not defined or are defined not only regionally. Since UMTS forms an essential field of use for the present invention, the following text uses the description of an exemplary embodiment with reference to the figures of the drawing to describe the protocol structure of UMTS, although the present invention is not restricted to such application.

The planning for a method according to the present invention is advantageously carried out in two stages: a first message is used to signal where, how many and when resources are assigned for the transmission of multicast messages. Accordingly, this message advantageously may be very short. The first message is preferably used to transmit information elements with details about what resources of the transport channels or which frames of the physical channels are reserved or assigned for the transmission of messages. Signaling therefore does not take place until the planning for the transmission of a message, thus defining which physical channels and transport channels are used for the transmission of messages. The method according to the present invention thus can be adapted in a very flexible manner. In the case of UMTS, a common traffic channel CTCH is mapped in one embodiment of the present invention, on the basis of a requirement by the sender, onto other transport channels than the forward access channel FACH, and onto other physical channels than the secondary common control physical channel S-CCPCH.

Various protocol layers are configured on the basis of discontinuous reception DRX planning messages by the radio resource monitoring unit RRC; that is to say, by the RRC of a sender for unidirectional connections. Notification therefore is provided at a physical level of a recipient as to the resources in which data can be expected in an MC message or further planning messages. In this case, the messages about planning and/or assignment of resources include, in one embodiment of the present invention, information about a respective multicast group, so that entire groups of recipients are informed. Groups such as these, particularly multicast groups, are preferably indicated by an MC group address or an MC group identity.

Further information in a message is identified in a particularly advantageous manner in a monitoring layer in a recipient in order to decide whether an MC message with payload data should be received. Thus, for example, the only subscribers who are accessed are those who wish to receive sports messages so that, by using this group identity, information and data are effectively prevented from being read unnecessarily by subscribers who have no interest in messages in the corresponding group.

A first planning stage, MC DRX level 1, is used to signal which physical channels and transport channels will be used for the transmission of MC messages. In other words, the resources which are used or reserved for transmission of point-to-multipoint services, particularly the MBMS service, are signaled and/or notified for the transmission of messages and/or signaling data. This is preferably done in the DRX level 1 message, and allows the subscriber terminal to be informed of when messages and/or signaling data, particularly the DRX level 2 messages, actually will be transmitted. This is also used to signal where and on what channels these messages will be transmitted. In one embodiment, a basic specification of the messages and/or signaling data is also produced in order to decide whether this is a CBS, multimedia broadcast or multicast. The advantages of the respective indication, which is linked to a message, about the transmission channels and the fundamental classification of the information which can be expected will be described in more detail in the following text. However, even when using UMTS, it is possible for the CTCH to be mapped, on the basis of a requirement by the sender, onto other transport channels than the FACH and onto other physical channels than the S-CCPCH.

On the basis of the discontinuous reception DRX planning messages, various protocol layers are configured via the radio resource monitoring unit RRC, in particular by the RRC in a receiver. In this case, a notification is provided at a physical level as to the resources in which data in an MC message or further planning messages can be expected. These messages about planning and/or assignment of resources include information about a respective multicast group. This further information in a message, inter alia relating to a group association, is identified in a monitoring layer BMC in order to decide whether an MC message with payload data should be received. This information is preferably signaled in the course of an MC DRX level 2 message, which includes information about the physical channels and transport channels on which MC messages actually will be transmitted as payload data. Alternatively, payload data contents also are signaled in the course of an MC DRX level 2 message itself with details about resources via which a multicast message subsequently will be actually transmitted.

In one preferred embodiment of the present invention, previously assigned indices are used as the basis for assigning or notifying when MC messages are actually transmitted to resources of physical channels and transport channels, such as frames, in which case an offset with respect to a first frame which is used for an MC transmission, and/or a length of the CBS planning period, can be indicated.

Preferably, an information element also is transmitted in order to decide on reserved resources in resources for broadcast or multicast services, so that the method according to the present invention can be used for both services.

Owing to the progress in miniaturization, the method according to the present invention is implemented in a mobile telephone as a transmitting and/or receiving unit, with a mobile unit preferably being designed to send and/or receive multimedia messages. A corresponding communications system also can cope with the relatively large amounts of data for multimedia message by virtue of the flexibility explained above.

Additional features and advantages of the present invention are described in, and will be apparent from, the following Detailed Description of the Invention and the Figures.

BRIEF DESCRIPTION OF THE FIGURES

FIG. 1 shows a simplified structogram illustrating a protocol stack in UMTS.

FIG. 2 shows an assignment of frames to a logical channel CTCH via which cell broadcast messages are transmitted.

FIG. 3 shows an index layout as is used for CBS DRX, in order to allocate an index to sets of resources and frames.

FIG. 4 shows the information element that is used according to the prior art for signaling of the CBS DRX level 1 information as a detail from [3].

FIG. 5 shows the information element that is used according to the prior art for signaling the BMC scheduling message CBS DRX level 2 as a detail from [4].

DETAILED DESCRIPTION OF THE INVENTION

A protocol stack in the universal mobile telecommunications system UMTS has a multilayer structure and is subdivided into the physical layer, the data link layer and the network layer. The data link layer is subdivided into the sub-layers of medium access control MAC, radio link control RLC, packet data convergence protocol PDCP and broadcast/multicast control MBC, as shown in the illustration in FIG. 1. The network layer includes two parts the radio resource control RRC and a duplication avoidance, with only the RRC layer also ending in the UMTS Terrestrial Radio Access Network UTRAN. The corresponding instance for the duplication avoidance does not belong to the UTRAN, but is moved out to a core network CN. In the layer L3 and the RLC layer, a distinction is drawn between a user plane N plane and a control plane C plane, with the PDCP layer and the BMC layer belonging exclusively to the user plane. Ellipses between the layers symbolize the locations of the service access points for communication with the respective partner instance, as defined in [2].

The RRC layer manages and controls the use of the radio equipment and, therefore, has connections via control service access points to all the other layers in order to control their configuration. These control service access points thus are not used for communication between partner instances, but exclusively between layers in the same protocol stack. The connections between the RRC and lower layers are used for reception of measured values from the bit transmission layer and MAC layer as well as for controlling functions in the individual layers. The RRC layer determines, for example, the nominal value of the inner power control loop, which is implemented in the bit transmission layer.

The transmission via the air interface is provided via so-called physical channels. The transmission services in the physical layer are provided at the service access points via so-called transport channels. Transport channels are characterized by how the data is transmitted. The transmission services for the monitoring and MAC layer are provided via the logical channels. Logical channels are characterized by the type of data being transmitted. A distinction is, in this case, drawn between monitoring data and traffic or payload data.

Various logical channels and transport channels are mentioned in the following text, and therefore will be described briefly:

CBS messages are transmitted between the RLC and MAC via a logical channel which is called the common traffic channel CTCH. The CTCH is used for transmission of data in the user plane to all subscriber terminals UEs or to a group of subscriber terminals. The CTCH is a unidirectional point-to-multipoint channel in the downlink path, which is mapped onto a transport channel or forward access channel FACH.

The FACH is a common transport channel on the downlink path and is used for transmission of relatively small amounts of data. The FACH is then mapped onto a physical channel which is called the secondary common control physical channel S-CCPCH. In principle, the S-CCPCH carries information for the FACH and for one or more paging channels PCH. The primary CCPCH P-CCPCH transmits the BCH information.

The logical channel called the broadcast control channel BCCH is a common channel for the downlink path, on which monitoring data is sent back to all the subscriber terminals in a radio cell. This monitoring data is, for example, the system information blocks SIB. The BCCH is mapped either onto the FACH or onto the broadcast channel BCH.

The transmission of data with interrupted reception or so-called discontinuous reception DRX already has been described in the introduction as a known measure in order, for example, to reduce the power consumption of mobile radios. DRX is used inter alia for the cell broadcast service CBS which is specified in UMTS. The system-internal planning as to when frames and/or resources are available for CBS services and when these resources transport CBS messages is notified via so-called scheduling information. This planning is carried out in two stages:

The first planning stage, CB DRX level 1, is intended to signal what resources in the transport channel FACH and what frames in the S-CCPCH are in fact reserved and/or assigned for the transmission of cell broadcast messages. This signaling is intended to be transmitted as part of the system information to the RRC via the logical channel BCCH. The CB DRX level 1 message is used to signal how many frames are assigned for the transmission of cell broadcast messages, and when. The illustration in FIG. 4 shows an information element which is used according to the prior art for signaling of the CBS DRX level 1 information. CB messages then can be transmitted only in these frames.

The illustration in FIG. 2 shows an example of the assignment of frames to the logical channel CTCH via which the cell broadcast messages are transmitted. An offset by two frames with respect to the frame No. 0, a periodicity of the allocated resources of six frames and a total, of two successive frames are assumed in this case. A mobile radio UE which wishes to receive CB messages now does not need to check the contents of each frame, but only the contents of the frames with the numbers 2/3, 8/9, 14/15, etc. This reduces the processing complexity and, at the same time, the power consumption within the subscriber terminal.

CBS DRX uses an index scheme which allocates an index to the sets of resources or frames, as is illustrated in the illustration in FIG. 3. The assignment of the resources in the second planning stage, which follows, then can be carried out very easily via these indices.

For the second planning stage, CBS DRX level 2, a so-called inband scheduling message is transmitted together with the actual CB message on the logical channel CTCH, and is evaluated by the BMC. This CBS DRX level 2 message is used to transmit various information to the subscriber terminals, as shown in the illustration in FIG. 5, which illustrates an information element which is used according to the prior art for signaling the CBS DRX level 2 information. The illustrated information also includes:

Information as to which of the resources notified in the CBS DRX level 1 message actually will be used to transmit CB messages, indicated by the resource indices that are used.

An indication is provided, inter alia, of any offset with respect to the first frame that is used for transmission of MC messages and the length of the CBS planning period; that is to say, the number of successive resources.

Message type (CBS message or scheduling message).

Message identification (identification of source and type of the CBS message).

Serial number. (Information for the subscriber terminal from which it can determine whether it already has received a specific message).

Coding scheme (information about the coding and language used).

The RRC and BMC use so-called primitives to interchange, inter alia, information about the configuration of the various planes and units.

After receiving an appropriate scheduling message, the BMC informs the RRC whether it should configure the physical level for reception of CBS messages. The RRC then once again informs the BMC of the CTCH configuration settings carried out. Furthermore, information about data flow measurements, inter alia, also is interchanged.

For introduction, according to the present invention, of discontinuous reception DRX for multicast or MC services, particularly in UMTS, the techniques described above are adapted with the aim of making it possible to use the characteristics of discontinuous reception DRX, as already have been described for CB services, and for multicast or MC services in UMTS, as well. The method according to the present invention for use of discontinuous reception DRX for multicast services is referred to in the following text as MC DRX.

The planning for MC DRX, as to which resources are available for MC services and when these resources will transport multicast messages, is notified via appropriate messages, in a comparable manner to the CBS. The messages for the planning and assignment of the resources for this purpose include, inter alia, information about the multicast groups. In one embodiment, the multicast groups are indicated by an MC group address or an MC group identity.

The planning for MC DRX as to which physical channels or transport channels, frames and resources will be available for MC services, and when, as well as when these resources will transport multicast messages is notified via so-called "scheduling messages" or planning messages. The various UMTS protocol layers are configured by the radio resource monitoring unit RRC on the basis of these planning messages. The information, therefore, already is available at the physical level as to the resources in which an MC message or further planning messages can be expected. Furthermore, the BMC layer can evaluate further information in order to decide which MC messages actually should be received. The planning is carried out in two stages, as described in the following text:

The first planning stage, MC DRX level 1, signals which physical channels and transport channels will be used for the transmission of planning information, in order to prepare for the transmission of MC messages. This is because, in comparison to CBS, the CTCH for MC services also is optionally mapped onto other transport channels than the FACH and onto other physical channels than the S-CCPCH. Furthermore, the MC DRX level 1 message is used to transmit information elements as to which frames in the physical channels are reserved or assigned for the transmission of further planning information.

This signaling is transmitted as part of the system information to the RRC via the logical channel BCCH. The MC DRX level 1 message thus signals where, how many and when resources will be assigned for the transmission of multicast messages. MC messages then can be transmitted only in these frames.

According to the present invention, MC DRX makes use of an index scheme in which indices are allocated to the sets of the resources in conjunction with the physical channels and transport channels that are used. The assignment of the resources in the second planning stage, which follows this, is then carried out very simply via these indices.

For the second planning stage, MC DRX level 2, a so-called "inband scheduling message" is transmitted together with the actual MC message, and is then evaluated by the BMC. Various information is transmitted to the subscriber terminals UE in this MC DRX level 2 message. This includes, inter alia:

1. Information about which physical channels and transport channels that are mentioned in the MC DRX level 1 message actually will be used to transmit MC message.
2. Information about the resources which are notified in the MC DRX level 1 message which actually will be used to transmit multicast messages.
3. Message type, that is to say a distinction between an MC message or a scheduling message.
4. Message identification (MC group address or MC group identification, identification of the source and type of the MC message).
5. Serial number (information for subscriber terminals, from which they can tell whether they already have received a specific message).
6. Coding scheme (information about the coding and language used).

In the case of items 1 and 2 mentioned above, when using the described index scheme according to the present invention, the assignment and notification as to when MC messages actually will be transmitted on the resources of the physical channels and of the transport channels can be carried out via the previously assigned indices. Otherwise, a different allocation rule is stipulated. An indication also is always provided, inter alia, of any offset with respect to the first frame that is used for MC transmission and the length of the CBS planning period; that is to say, the number of successive resources.

For the situation where the already existing DRX for CBS is extended by the functionality of supporting MC DRX, an information element is introduced which is used to distinguish whether the reserved resources are resources for broadcast or multicast services. For example, the "message type" can be used to distinguish between a CBS message, an MC message, a scheduling message. etc.

The method according to the present invention can be adapted very flexibly, by allocation of resources, to match the size of a message to be transmitted. Thus, it also is possible to use the method according to the present invention to send complex messages, such as messages with a multimedia content, so-called multimedia messages MM. The already sent level 1 and level 2 messages for planning and preparation for transmission require considerably less transmission bandwidth than multimedia contents. The level 1 and/or level 2 message can be transmitted via a relatively narrowband channel wherein, in the case of a communications system with two or more transmissions that take place simultaneously, the overall available bandwidth can be distributed and/or assigned very effectively.

For this purpose, in an embodiment of the present invention which will not be described in further detail, an information element for signaling the CBS DRX level 1 information is extended, as shown in the illustration in FIG. 4, or new information elements are introduced.

This solution, therefore, defines the resource that is used for the transmission of MBMS services, taking into account the backward compatibility. In comparison to known methods, physical channels other than the S-CCPCH, transport channels other than the FACH, and logical channels other than the CTCH are also used for the transmission of MBMS services.

The resources which are used for the transmission of MBMS services are defined by an extension, which likewise is not described in further detail, of the information element (which is illustrated in the illustration in FIG. 5) for signaling the BMC scheduling message on the basis of CBS DRX level 2. In this case, in particular, a configuration of the resources is largely released. The characteristics of the physical channels, transport channels and logical channels and the parameters for assignment of the resources are added to, so that it is now possible to state freely within a wide range when and which of the configured resources will be allocated for which MBMS group.

Although the present invention has been described with reference to specific embodiments, those of skill in the art will recognize that changes may be made thereto without departing from the spirit and scope of the present invention as set forth in the hereafter appended claims.

Background details relating, inter alia, to the protocols dealt with in the present application can be found, in summarized form, in the following references:

[1] 3GPP 25.211, Physical Channels and mapping of transport channels onto physical channels, Release 99.
[2] Walke, B.: Mobilfunknetze und ihre Protokolle [Mobile radio networks and their protocols], Volume 1, Teubner Verlag GmbH, Wiesbaden 2000.
[3] 3GPP TS 25.331 V3.6.0, RRC Protocol Specification, Release 1999.
[4] 3GPP TS 25.324 V3.4.0, Broadcast/Multicast Control BMC, Release 1999.

The invention claimed is:

1. A method for transmitting multimedia messages of various sizes in a radio communication system via Multimedia Broadcast Multicast Service using a multilayer protocol architecture from a sender via multiple transmission channels to a multicast group of receivers in the radio communication system, wherein each transmission channel is one of a logical channel, a transport channel, and a physical channel, wherein the radio communication system allows for discontinuous data reception by the receivers, and wherein transmitting a variable sized multimedia message to the multicast group via Multimedia Broadcast Multicast Service comprises:

assigning indices to sets of resources in the radio communication system for communicating data;

sending at least one first planning message via at least one first transmission channel, wherein the at least one first planning message identifies at which times at least one second transmission channel is reserved or assigned for the transmission of further planning information regarding the sending of the variable-sized multimedia message; and sending at least one second planning message via the at least one second transmission channel at one or more of the identified times in which the at least one second transmission channel is reserved or assigned, wherein the at least one second planning message identifies one or more third transmission channels that are actually used for transmission of the variable-sized multimedia message, and identifies a multicast group address or a multicast group identity corresponding to the multicast group;

wherein the previously assigned indices are used as the basis for notifying the receivers as to the time and the particular resources upon which the variable-sized multimedia message will actually be transmitted to the receivers.

2. The method according to claim 1, wherein the method is performed as one of (1) an extension to a broadcast service by multimedia transmission, and (2) a multicast service.

3. The method according to claim 2, wherein information about a respective recipient group is attached to at least one of the first and second planning messages.

4. The method according to claim 3, wherein recipient groups are indicated by a recipient group address or a recipient group identity.

5. The method according to claim 2, wherein information about a multicast group is attached to at least one of the first and second planning messages.

6. The method according to claim 1, wherein indices are used as the basis for notifying when second planning messages are actually transmitted on second transmission channels, wherein said indices have been previously assigned.

7. The method according to claim 1, wherein the first message further indicates which frames of the transmission channels are reserved for the transmission of data.

8. The method according to claim 1, wherein the one or more third transmission channels comprises a subset of the one or more second transmission channels.

9. A telecommunication apparatus for transmitting multimedia messages of various sizes in a radio communication system via Multimedia Broadcast Multicast Service using a multilayer protocol architecture from a sender via multiple, transmission channels to a multicast group of receivers in the radio communication system, wherein each transmission channel is one of a logical channel, a transport channel, and a physical channel, and wherein the radio communication system allows for discontinuous data reception by the receivers, the telecommunication apparatus configured to transmit a variable sized multimedia message to the multicast group via Multimedia Broadcast Multicast Service, including:

assigning indices to sets of resources in the radio communication system for communicating data;

sending at least one first planning message via at least one first transmission channel, wherein the at least one first planning message identifies at which times at least one second transmission channel is reserved or assigned for the transmission of further planning information regarding the sending of the variable-sized multimedia message; and sending at least one second planning message via the at least one second transmission channel at one or more of the identified times in which the at least one second transmission channel is reserved or assigned, wherein the at least one second planning message identifies one or more third transmission channels that are actually used for transmission of the variable sized multimedia message, and identifies a multicast group address or a multicast group identity corresponding to the multicast group;

wherein the previously assigned indices are used as the basis for notifying the receivers as to the time and the particular resources upon which the variable sized multimedia message will actually be transmitted to the receivers.

10. The telecommunication apparatus according to claim 9, wherein the transmission of data is performed as one of (1) an extension to a broadcast service by multimedia transmission, and (2) a multicast service.

11. The telecommunication apparatus according to claim 10, wherein information about a respective recipient group is attached to at least one of the first and second planning messages.

12. The telecommunication apparatus according to claim 11, wherein recipient groups are indicated by one of a recipient group address and a recipient group identity.

13. The telecommunication apparatus according to claim 10, wherein information about a multicast group is attached to at least one of the first and second planning messages.

14. The telecommunication apparatus according to claim 9, wherein indices are used as the basis for notifying when second planning messages are actually transmitted on second transmission channels, wherein said indices have been previously assigned.

15. The telecommunication apparatus according to claim 9, wherein the first message further indicates which frames of the transmission channels are reserved for the transmission of data.

16. The telecommunication apparatus according to claim 9, wherein the one or more third transmission channels comprises a subset of the one or more second transmission channels.

17. A method for transmitting multimedia messages of various sizes in a radio communication system via Multimedia Broadcast Multicast Service using a multilayer protocol architecture from a sender via multiple transmission channels to a multicast group of receivers in the radio communication system, wherein each transmission channel is one of a logical channel, a transport channel, and a physical channel, wherein the radio communication system allows for discontinuous data reception by the receivers, and wherein transmitting a variable sized multimedia message to the multicast group via Multimedia Broadcast Multicast Service comprises:

sending at least one first planning message via at least one first transmission channel, wherein the at least one first planning message identifies at which times at least one second transmission channel is reserved or assigned for the transmission of further planning information regarding the sending of the variable-sized multimedia message; and sending at least one second planning message via the at least one second transmission channel at one or more of the identified times in which the at least one second transmission channel is reserved or assigned, wherein the at least one second planning message identifies one or more third transmission channels that are actually used for transmission of the variable-sized multimedia message, and identifies a multicast group address or a multicast group identity corresponding to the multicast group.

* * * * *